US012752141B2

(12) United States Patent
Kibler

(10) Patent No.: US 12,752,141 B2
(45) Date of Patent: Oct. 6, 2026

(54) FASTENING DEVICE

(71) Applicant: Groupe Save, Merignac (FR)

(72) Inventor: Philippe Kibler, Ternay (FR)

(73) Assignee: Groupe Save, Merignac (FR)

( * ) Notice: Subject to any disclaimer, the term of this patent is extended or adjusted under 35 U.S.C. 154(b) by 248 days.

(21) Appl. No.: 18/710,509

(22) PCT Filed: Nov. 9, 2022

(86) PCT No.: PCT/EP2022/081193
§ 371 (c)(1),
(2) Date: May 15, 2024

(87) PCT Pub. No.: WO2023/088736
PCT Pub. Date: May 25, 2023

(65) Prior Publication Data

US 2026/0168215 A1 Jun. 18, 2026

(30) Foreign Application Priority Data

Nov. 22, 2021 (FR) ....................................... 2112311

(51) Int. Cl.
*B05B 15/65* (2018.01)
*A62C 35/68* (2006.01)

(52) U.S. Cl.
CPC .............. *A62C 35/68* (2013.01); *B05B 15/65* (2018.02)

(58) Field of Classification Search
CPC .......... E03C 1/021; B05B 15/65; F16L 25/14; E03B 7/09; A62C 35/68; A62C 37/09
(Continued)

(56) References Cited

U.S. PATENT DOCUMENTS 379,240 A * 3/1888 Miller .................... A62C 37/09 169/40
1,875,233 A * 8/1932 Gewalt .................. A62C 37/50 169/37

(Continued)

FOREIGN PATENT DOCUMENTS

DE 200 13 555 U1 12/2000
EP 2 536 885 B1 12/2013
KR 2016 0091292 A 8/2016

OTHER PUBLICATIONS

International Search Report and Written Opinion, corresponding International Application No. PCT/EP2022/081193, mailing date Feb. 14, 2023.

*Primary Examiner* — Jonathan Liu
*Assistant Examiner* — Guang H Guan
(74) *Attorney, Agent, or Firm* — MARSHALL, GERSTEIN & BORUN LLP

(57) ABSTRACT

A device for fastening an element to an end of a tube intended to be pressurized is disclosed. The tube includes at least two flats and a threaded portion. The fastening device includes a base supporting the element and intended to be attached to the end of the tube. The base has at least two anchoring points. The fastening device also includes at least two elongate elements, each elongate element having a first end configured to engage with a respective anchoring point of the at least two anchoring points of the base. The fastening device further includes a disc onto which a second end of each elongate element is attached, and a nut having a thread matching a thread of the threaded portion of the tube.

10 Claims, 5 Drawing Sheets

(58) Field of Classification Search
USPC .......................................................... 169/37
See application file for complete search history.

(56) References Cited

U.S. PATENT DOCUMENTS

| | | | | | |
|---|---|---|---|---|---|
| 2,838,965 | A * | 6/1958 | Mueller | F16L 41/06 | 408/72 R |
| 5,018,770 | A * | 5/1991 | Beasley | A62C 35/68 | 81/463 |
| 5,109,929 | A * | 5/1992 | Spears | F16L 47/24 | 169/37 |
| 5,149,144 | A * | 9/1992 | Blakeley | A62C 35/68 | 285/23 |
| 6,631,730 | B1 * | 10/2003 | Bloom | E03C 1/0402 | 285/193 |
| 7,766,252 | B2 * | 8/2010 | Jackson | A62C 3/004 | 239/37 |
| 8,297,663 | B2 * | 10/2012 | Spears | F16L 15/02 | 285/355 |
| 8,336,920 | B2 * | 12/2012 | Stempo | F16L 37/088 | 138/110 |
| 8,931,571 | B2 * | 1/2015 | Sarkisyan | A62C 35/68 | 239/203 |
| 9,261,129 | B2 * | 2/2016 | Herrema | F16B 21/073 | |
| 9,278,238 | B2 * | 3/2016 | Thau, Jr. | A62C 35/68 | |
| 10,413,766 | B2 * | 9/2019 | Mete | A62C 37/50 | |
| 10,471,288 | B2 | 11/2019 | Bancroft et al. | | |
| 10,905,909 | B2 * | 2/2021 | Ringer | A62C 37/09 | |
| 2026/0168215 | A1 * | 6/2026 | Kibler | E03B 7/09 | |

* cited by examiner

FASTENING DEVICE

TECHNICAL FIELD

The present invention relates to the field of fastening devices at the end of tubes intended to be pressurized. More specifically, the invention allows fastening an element to the end of a tube, for example a sprinkler on a candle.

Indeed, in the field of fire safety, sprinklers can be mounted at the end of a tube called a “candle” to facilitate the positioning of the sprinkler with respect to a water conveyance pipe on which the candle is fastened.

The invention can also be used for other types of elements and tubes intended to be pressurized, for example to fasten a pressure or temperature sensor at one end of these tubes.

BACKGROUND

To fasten an element at the end of a tube, a sleeve is conventionally used, a first portion of which is fastened at the end of the tube and a second portion carries the element or means for supporting this element.

For example, for fastening a sprinkler on a candle attached to a water pipe, the candle typically has a diameter of 25 mm and a length comprised between 10 cm and 1 m.

In turn, the sprinkler head has a base with a cylindrical portion of smaller diameter, for example comprised between 12 and 15 mm. To fasten the base of the sprinkler on the end of the candle, the cylindrical portion of the base has an outer thread and the candle also has an external thread. A diameter adapter sleeve is then used.

This adapter sleeve includes a first portion intended to be screwed onto the external thread of the candle with an inner diameter of 25 mm and a second portion intended to receive the threaded cylindrical portion of the base of the sprinkler.

Thus, to mount a sprinkler at the end of a candle, and guarantee maintenance of the pressure inside this candle, an operator conventionally uses oakum which he/she wraps around the screw thread of the upper end candle and grease to hold this oakum. The operator screws the first portion of the sleeve around the upper end of the candle so that the oakum and the grease ensure sealing of the connection of the sleeve to the candle. The operator then repeats these same steps to screw the base of the sprinkler onto the second portion of the sleeve, i.e. by also positioning oakum and the grease.

This technique of fastening an element to the end of a tube is very classic but requires significant handling time for the operator in order to correctly arrange the oakum and the grease, and to tighten the first portion of the sleeve on the candle, then the base of the sprinkler on the second portion of the sleeve.

Furthermore, this type of fastening requires an element with a bulky base because the latter should have a cylindrical portion on which a thread is attached. Yet, for some applications, the height of the base might be problematic.

Thus, fastening an element to the tube end today poses a technical problem of time of installation of the element and costs of making the element since it should have a base with a cylindrical portion.

SUMMARY OF THE DISCLOSURE

To solve this technical problem, the invention proposes using an element mounted on a base without a cylindrical portion. Indeed, the base includes only anchoring points on which elongate elements can be fastened in order to press the base against the upper end of the tube.

The fastening device is complex because it integrates, besides these elongate elements, a disc and a nut allowing tensioning the elongate elements using the nut to move the disc on which the elongate elements are fastened.

This fastening device also requires the use of a special tube in which flats are formed so that the elongate elements extend into these flats and do not rotate around the tube when the nut moves.

To this end, the invention relates to a device for fastening an element on one end of a tube intended to be pressurized, the tube comprising at least two flats and a threaded portion; the fastening device including:

- a base supporting the element and intended to be attached to the end of the tube; the base including at least two anchoring points;
- at least two elongate elements; each elongate element including a first end configured to cooperate with an anchoring point of the base;
- a disc on which a second end of each elongate element is fastened; and
- a nut having a thread matching the thread of the threaded portion of the tube;
- the disc having an inner opening whose diameter is larger than the outer diameter of the tube and smaller than the outer radial dimensions of the nut so that the element could be attached on the end of the tube with the disc arranged around the threaded portion of the tube so that the elongate elements extend into the flats of the tube, screwing of the nut onto the threaded portion of the tube moves the disc away from the end of the tube while tensioning the elongate elements, and the tension of the base on the end of the tube withstands a pressurization of the tube.

Thus, the invention enables an operator to quickly mount the element at one end of a tube by placing the disc around the end of the tube so that the elongate elements are arranged in the flats of the tube, arranging the nut on the disc and these elongate elements, positioning the base and the elongate elements on the base, and aiming the nut so as to tension the elongate elements and press the base onto the end of the tube.

Contrary to the state of the art, only one tightening is necessary and it is no longer necessary to use oakum and grease. Preferably, the fastening device also includes a seal intended to be arranged between the base and the end of the tube. Thus, the tension applied by the elongate elements on the base can compress the seal to ensure the desired sealing.

Furthermore, the element attached to the end of the tube may be smaller and less expensive to make because it is no longer necessary for this element to have a base with a threaded cylindrical portion because fastening of the base is now achieved by the tension of the elongate elements.

For example, each anchoring point comprises at least one lug forming a housing intended to receive an axis fastened to the first end of each elongate element.

The desired tension may be obtained by a color indicator present on the tube so that the operator knows how far he should move the nut to reach the desired pressure resistance.

Depending on the desired pressure resistance, the fastening device may comprise elongate elements whose shape and material allow addressing the tensile stresses. Furthermore, the base may be fastened with two, three or four elongate elements.

Preferably, the fastening device includes only two elongate elements intended to cooperate with two diametrically opposed flats on the tube. This embodiment allows ensuring acceptable stability to the base while limiting the number of elongate elements required.

Moreover, the nut preferably corresponds to a hexagonal nut, the outer radial dimensions of the nut being the dimension between the opposite flats of the nut.

Preferably, the inner opening of the disc has flats intended to be positioned opposite the flats of the tube. This embodiment allows defining the fastening position of the elongate elements on the disc.

According to one embodiment, the elongate elements are fastened by a weld bead at the level of the flats of the disc.

According to another embodiment, the disc has tabs extending perpendicular to the surface of the disc at the level of the flats, the elongate elements being fastened by heat-fusion on the tabs of the disc.

The elongate element may take on different forms. In a first form, the elongate element is a strip, i.e., having a shape similar to a ribbon. Alternatively, the elongate element is a cable, thinner but nevertheless just as resistant. Indeed, the invention allows using elongate elements whose width is reduced without compromising the safety of the installations.

In practice, the elongate element is formed in a metallic material because, surprisingly, the invention allows using different metallic materials for making the elongate element without compromising the safety of the installations.

BRIEF DESCRIPTION OF THE FIGURES

The manner of carrying out the invention, as well as the advantages which result therefrom, will appear clearly from the following description of the embodiments, in support of the appended figures in which.

DETAILED DESCRIPTION

As illustrated in FIGS. 1 to 7, the invention relates to a fastening device 10*a*-10*b* allowing mounting an element 11 on one end 23 of a tube 20. The tube 20 is in the form of a generally cylindrical elongate element. This tube 20 can be fastened, at one end which is not shown, on a pipe by means of a connection sleeve. The opposite end 23 of the tube 20 is intended to receive the element 11. The tube 20 is configured to contain a fluid such as water or gas. To do so, the tube 20 is preferably made of steel, stainless steel, copper or superchlorinated polyvinyl chloride.

The element 11 may correspond to a sprinkler, a pressure gauge, or any other element intended to be fastened on a pressure pipe. This element 11 is mounted on a base 12, or equipped with a base 12, intended to be fastened on the end 23 of the tube 20. To do so, the tube 20 may have one end 23 with a shape matching the shape of the base 12.

Figure 1:
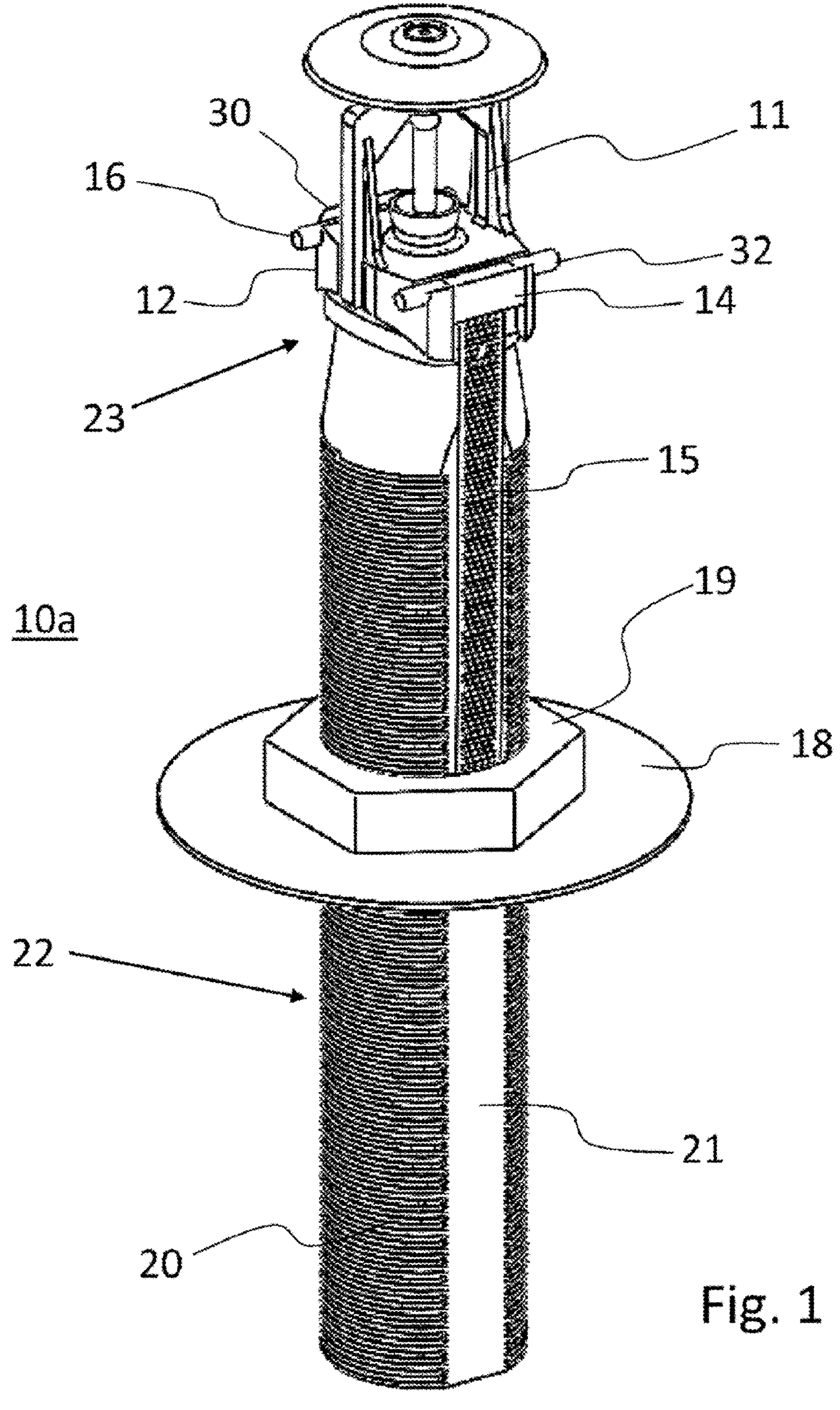
FIG. 1 is a perspective view of a device for fastening an element on a tube according to a first embodiment of the invention.
Figure 2:
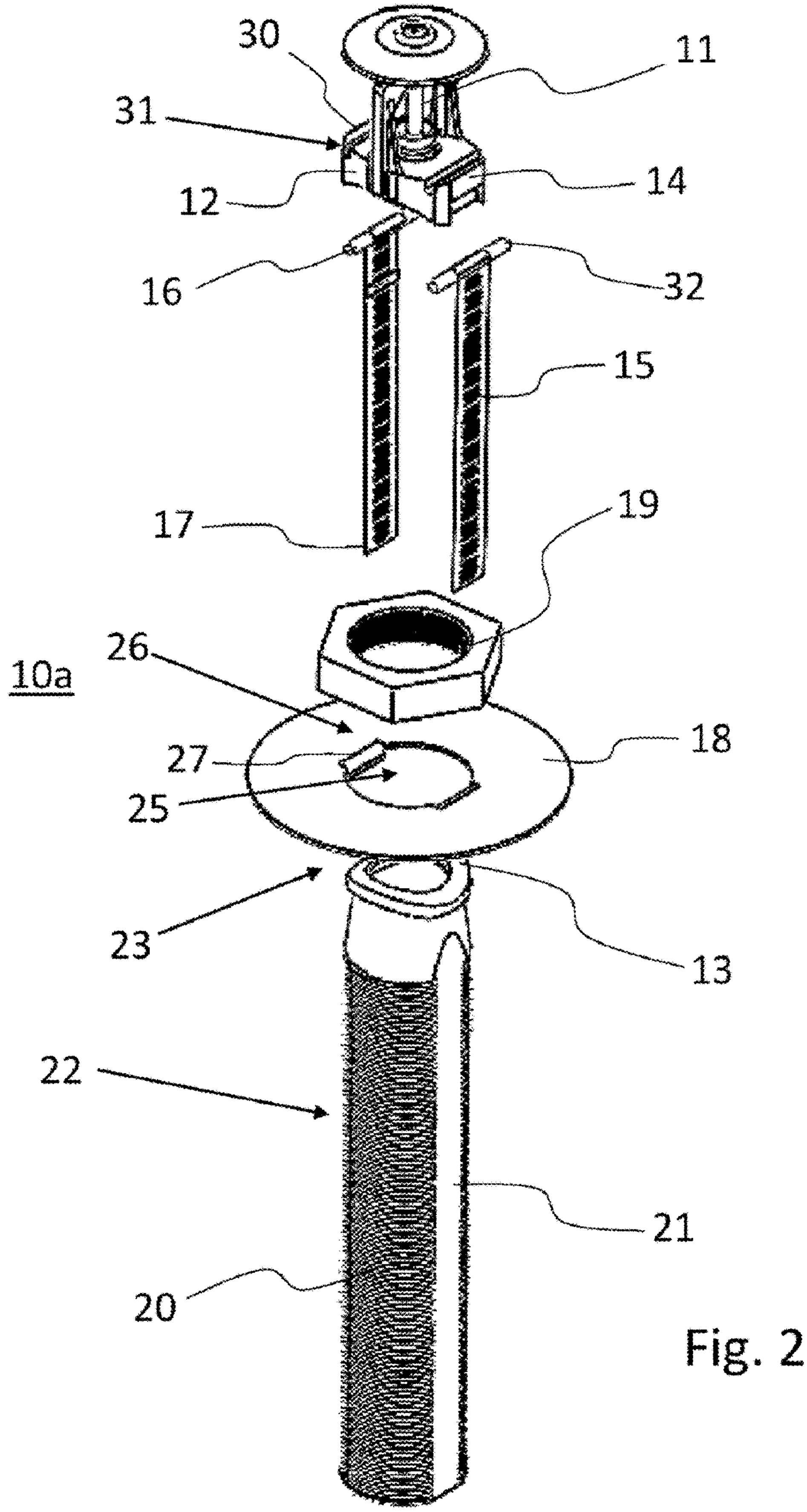
FIG. 2 is an exploded view of the fastening device of FIG. 1.
Figure 3:
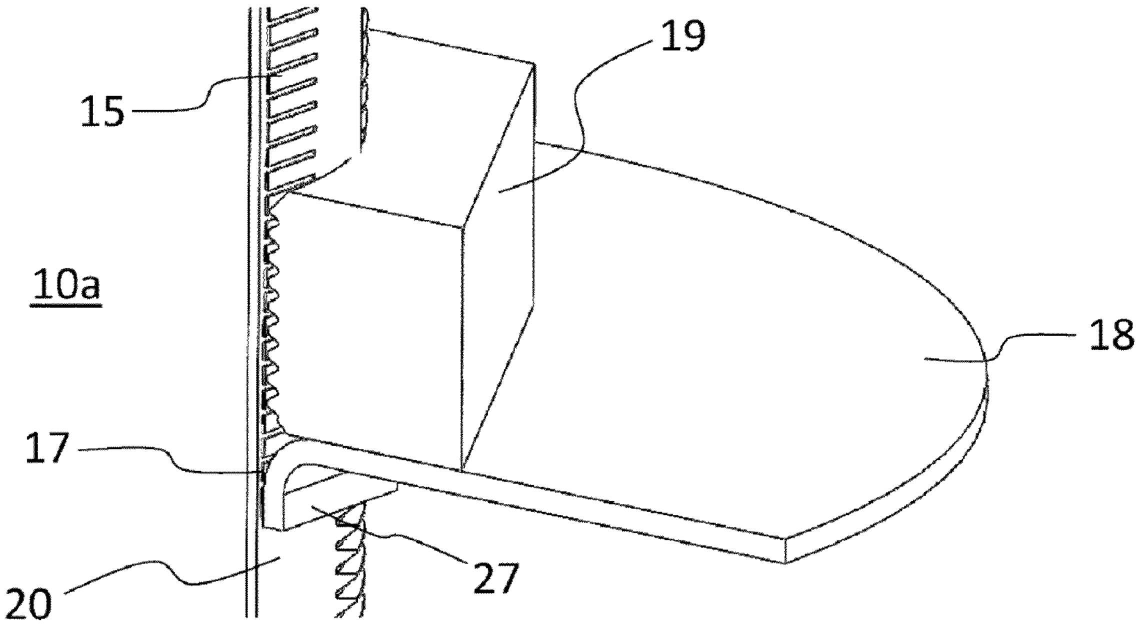
FIG. 3 is a partial sectional and perspective view of the fastening device of FIG. 1.
Figure 4:
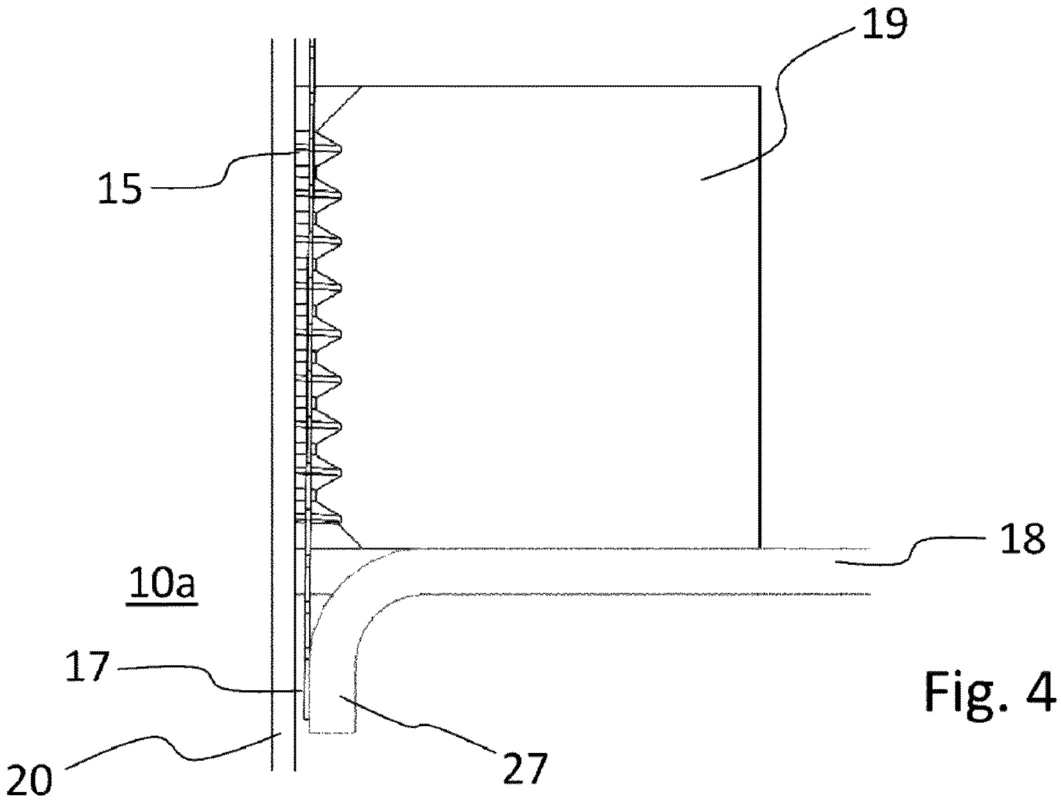
FIG. 4 is a partial sectional and perspective view of the fastening device of FIG. 1.
Figure 5:
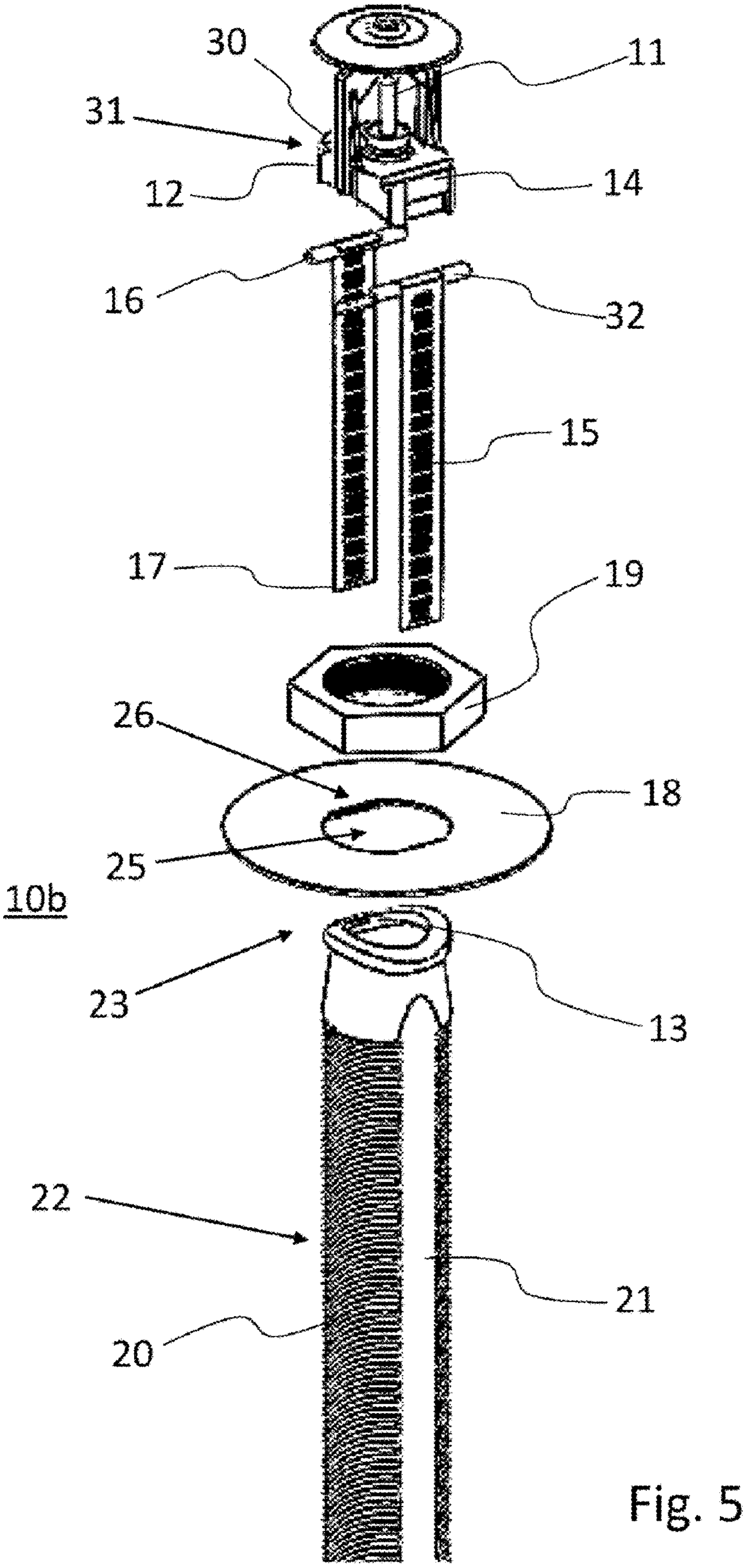
FIG. 5 is an exploded perspective view of a device for fastening an element on a tube according to a first embodiment of the invention.

Preferably, if the base 12 can be used for several applications, and in particular to be attached directly on pipes, the latter can have a radius of curvature intended to cooperate with the radius of curvature of the pipes. The end 23 may be shaped with a radius of curvature equivalent to that of the base 12, as illustrated in FIGS. 1, 2 and 5. At the level of the end 23, the tube 20 may also have a change in section in order to match with the dimensions of the base 12.

For example, the base 12 has a substantially planar parallelepiped shape with a thickness comprised between 0.5 and 1.5 cm. The base 12 further has a through opening with a diameter comprised between 10 and 100 mm.

Besides the specific features of the base 12 and of the end 23, the tube 20 also has an external threaded portion 22. This threaded portion 22 may extend over all or part of the length of the tube 20. Unlike conventional tubes, the threaded portion 22 has a discontinuous thread because flats 21 are provided over at least part of the length of the tube 20.

The flats 21 allow receiving elongate elements 15 of the fastening device 10*a*-10*b*. For example, these elongate elements 15 correspond to a metal strip or a strip with a width comprised between 0.5 and 2 cm or a cable with a diameter comprised between 0.2 and 1 cm. The number of flats 21 and of elongate elements 15 may vary without changing the invention. In the two embodiments of FIGS. 1 to 7, two elongate elements 15 cooperate with two diametrically opposed flats 21 on the tube 20.

These elongate elements 15 allow ensuring a pressure of the base 12 on the end 23 of the tube 20. To do so, the elongate elements 15 are fastened on the base 12 and they are brought away from the end 23 by a disc 18 and a nut 19.

To hold the elongate elements 15 on the base 12, a first end 16 of the elongate elements 15 cooperates with anchoring points 14 of the base 12.

In the context of the invention, the "anchoring points" correspond to the receiving elements of the base 12 allowing fastening the elongate elements 15. These anchoring points 14 may correspond to openings or excrescences, such as lugs.

As illustrated in FIGS. 1, 2 and 5, the anchoring points 14 are formed by lugs 30 forming housings 31.

A pin 32 arranged at the end 16 of an elongate element 15 is intended to be inserted into a housing 31 to hold the elongate element 15.

The other end 17 of each elongate element 15 is fastened on the disc 18 which is moved in translation away from the end 23 of the tube 20. To do so, the nut 19 has a thread matching the thread of the threaded portion 22 of the tube 20 and the nut 19 is free to rotate relative to the disc 18. Thus, the helical movements of the screen 19 do not drive the disc 18 in rotation but only in translation according to the longitudinal axis of the tube 20.

For the disc 18 to be moved only in translation, it has an inner opening 25 whose diameter is larger than the outer diameter of the tube 20 and smaller than the outer radial dimensions of the nut 19. When the nut 19 corresponds to a hexagonal nut, the outer radial dimensions of the nut 19 is the dimension between the opposite flats of the nut 19. However, other nut shapes may be used without changing the invention.

In FIGS. 1 to 7, the disc 18 has an outer diameter much larger than the outer radial dimensions of the nut 19. Alternatively, the outer diameter may be much smaller, and even smaller than or equal to the outer radial dimensions of the nut 19. The disc 18 and the nut 19 may be made of steel or stainless steel.

Furthermore, the inner opening 25 of the disc 18 preferably has flats 26 intended to be positioned opposite the flats 21 of the tube 20. The number of flats 26 of the disc 18, as well as the number of flats 21 of the tube 20 depend on the number of elongate elements 15 intended to be fastened on the base 12.

To fasten the second end 17 of each elongate element 15 on the disc 18, it is possible to use all known techniques. In the embodiment of FIGS. 1 to 4, the disc 18 includes tabs 27 extending perpendicular to the surface of the disc 18 at the level of the flats 26. In this embodiment, the elongate elements 15 are fastened by heat-fusion on the tabs 27.

Figure 6:
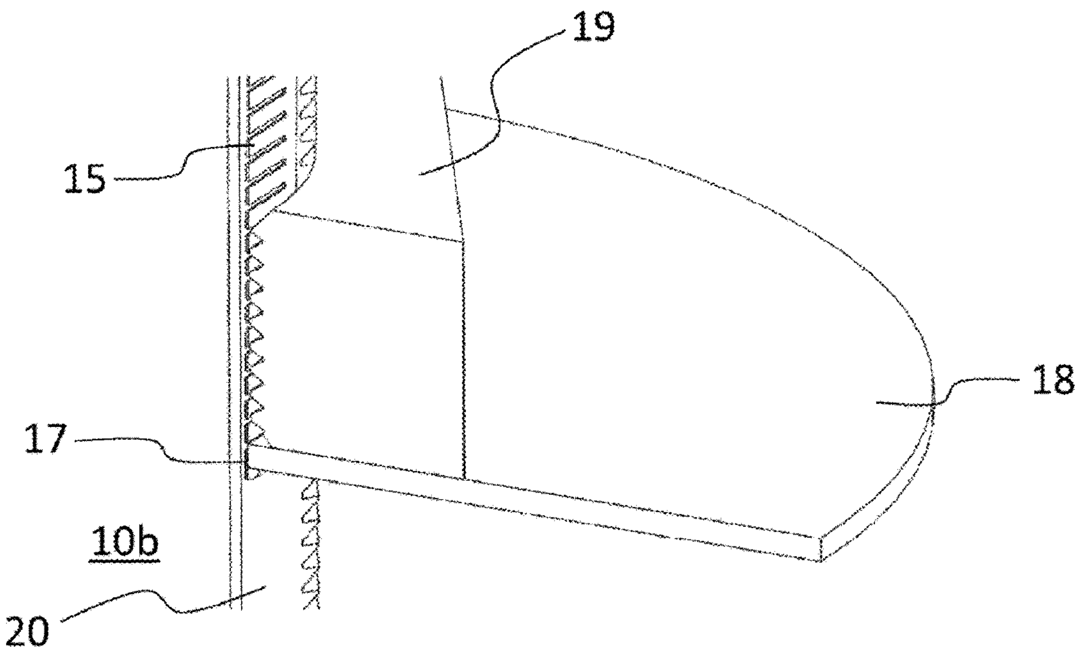
FIG. 6 is a partial sectional and perspective view of the fastening device of FIG. 5.
Figure 7:
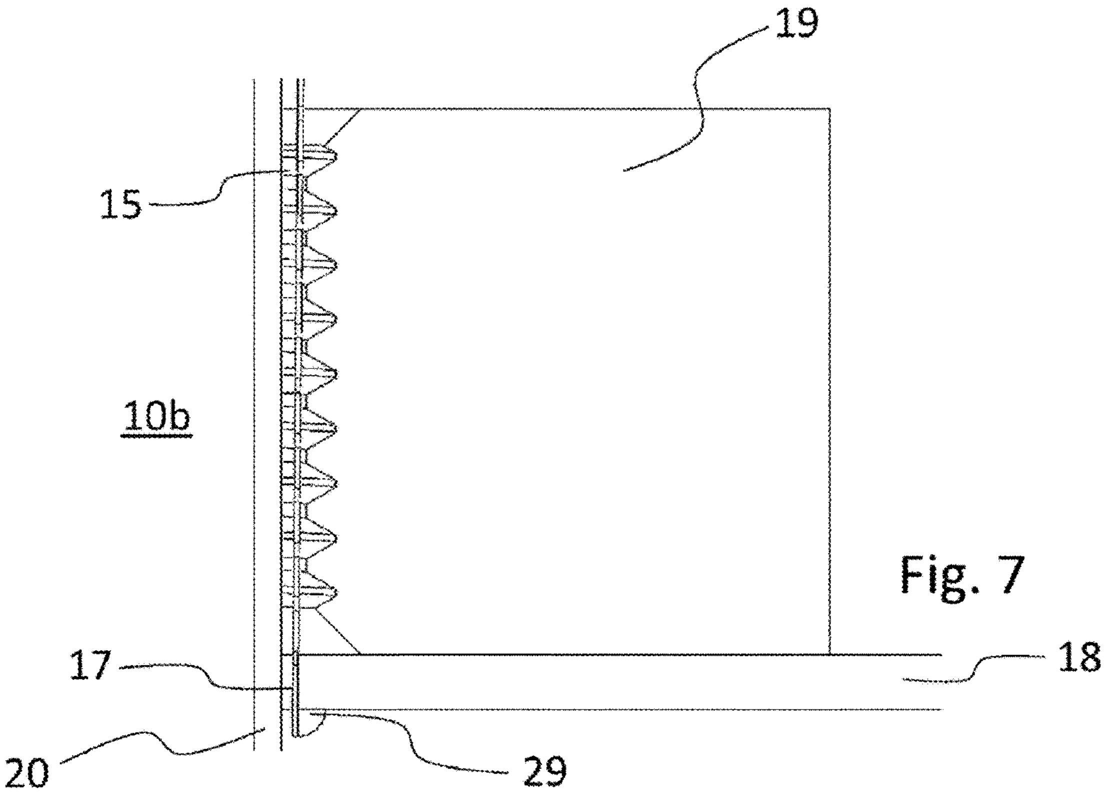
FIG. 7 is a partial sectional view of the fastening device of FIG. 5.

Alternatively, as illustrated in FIGS. 5 to 7, a simple weld bead 29 can be used to fasten the second end 17 of each elongate element 15 on the disc 18.

Advantageously, a seal 13 is positioned between the end 23 of the tube 20 and the base 12 so as to surround the opening of the base 12. For example, the seal 13 is a rubber O-ring with a thickness comprised between 0.2 and 0.7 cm.

Thus, to fasten the element 11 on the tube 20, all it needs is to place the disc 18 and the nut 19 so that the elongate elements extend into the flats 21 of the tube 20, as illustrated in FIG. 1. Afterwards, the base 12 is attached on the end 23 of the tube 20, possibly using a seal 13.

The operator should then simply position the elongate elements on the anchoring points 14 of the base 12 and tighten the nut 19 in the opposite direction from the end 23 of the tube 20 so as to obtain a solid fastening of the element 11 on the tube 20.

It follows that the invention allows obtaining a new method for fastening an element 11 to the end 23 of a tube 20 enabling rapid and secure installation by an operator and a low production cost.

The invention claimed is:

1. A fastening device comprising:

a tube intended to be pressurized, the tube comprising at least two flats and a threaded portion;

an element mounted on an end of the tube;

a base supporting the element and intended to be attached to the end of the tube; the base comprising at least two anchoring points;

at least two elongated elements, each elongated element comprising a first end configured to cooperate with a respective anchoring point of the at least two anchoring points of the base;

a disc on which a second end of each elongated element is fastened; and a nut having a thread matching a thread of the threaded portion of the tube, the disc having an inner opening with a diameter larger than an outer diameter of the tube and smaller than an outer radial dimension of the nut such that the element is attachable at the end of the tube with the disc arranged around the threaded portion of the tube, so that the at least two elongated elements extend into the at least two flats of the tube, such that screwing the nut onto the threaded portion of the tube moves the disc away from the end of the tube while tensioning the at least two elongated elements, and such that a tension of the base at the end of the tube withstands a pressurization of the tube.

2. The fastening device according to claim 1, wherein the fastening device also comprises a seal intended to be arranged between the base and the end of the tube.

3. The fastening device according to claim 1, wherein the at least two flats of the tube are diametrically opposed to one another.

4. The fastening device according to claim 1, wherein the nut is a hexagonal nut, the outer radial dimension of the nut being a dimension between opposite flats of the nut.

5. The fastening device according to claim 1, wherein the inner opening of the disc has at least two flats intended to be positioned opposite the at least two flats of the tube.

6. The fastening device according to claim 5, wherein the at least two elongated elements are fastened by a respective weld bead to the at least two flats of the disc.

7. The fastening device according to claim 5, wherein the disc has at least two tabs extending perpendicular to a surface of the disc at the at least two flats of the disc, the at least two elongated elements being fastened by thermo-fusion to the at least two tabs of the disc.

8. The device according to claim 1, wherein each anchoring point comprises at least one lug forming a housing intended to receive a respective axis fastened to the first end of a respective elongated element of the at least two elongated elements.

9. The device according to claim 1, wherein each elongated element is a strip.

10. The device according to claim 1, wherein each elongated element is made of a metallic material.

* * * * *